(12) United States Patent
Ross et al.

(10) Patent No.: US 8,128,396 B2
(45) Date of Patent: Mar. 6, 2012

(54) REUSABLE SEALING DEVICE

(75) Inventors: William Tod Ross, Cheney, KS (US);
Jeffery Max Buxman, Valley Center, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 270 days.

(21) Appl. No.: 12/264,973

(22) Filed: Nov. 5, 2008

(65) Prior Publication Data
US 2010/0112118 A1  May 6, 2010

(51) Int. Cl.
*B29C 70/44*  (2006.01)
*B32B 33/00*  (2006.01)

(52) U.S. Cl. ............. 425/389; 425/405.1; 156/286; 156/382; 264/102; 277/575; 277/644; 277/944

(58) Field of Classification Search .......... 425/387.1, 425/388, 389, 405.1, 405.2; 249/134, 139; 277/361, 363, 380, 402, 403, 407, 530, 532, 277/575, 582, 583, 647, 944, 644, 648, 921; 52/278, 459, 468; 156/285, 286, 381, 382; 264/102
See application file for complete search history.

(56) References Cited

U.S. PATENT DOCUMENTS

| | | | | |
|---|---|---|---|---|
| 3,666,600 A * | 5/1972 | Yoshino | ............ | 156/382 |
| 3,667,177 A * | 6/1972 | Biela | ............ | 52/278 |
| 3,760,544 A * | 9/1973 | Hawes et al. | ............ | 52/468 |
| 4,067,155 A * | 1/1978 | Ruff et al. | ............ | 52/105 |
| 4,167,092 A * | 9/1979 | Medwed | ............ | 53/329.3 |
| 4,822,651 A * | 4/1989 | Newsom | ............ | 428/36.8 |
| 5,665,301 A * | 9/1997 | Alanko | ............ | 264/571 |
| 5,678,380 A * | 10/1997 | Azzar | ............ | 52/716.4 |
| 5,716,488 A * | 2/1998 | Bryant | ............ | 156/382 |
| 5,939,013 A * | 8/1999 | Han et al. | ............ | 264/510 |
| 6,851,945 B2 * | 2/2005 | Potter et al. | ............ | 425/389 |
| 7,029,267 B2 * | 4/2006 | Caron | ............ | 425/389 |
| 2004/0089984 A1 * | 5/2004 | Crane et al. | ............ | 264/511 |
| 2006/0034967 A1 * | 2/2006 | Habisreitinger et al. | . | 425/436 R |
| 2007/0296126 A1 * | 12/2007 | Audette | ............ | 264/571 |
| 2008/0083493 A1 * | 4/2008 | Ridges et al. | ............ | 156/285 |
| 2008/0220112 A1 * | 9/2008 | Waldrop et al. | ............ | 425/405.1 |
| 2009/0278319 A1 * | 11/2009 | Hanson et al. | ............ | 277/312 |
| 2010/0112117 A1 * | 5/2010 | Ross et al. | ............ | 425/388 |

FOREIGN PATENT DOCUMENTS

WO   WO 2007/037702 A1 *  4/2007
WO   WO 2007037702 A1 *  4/2007

* cited by examiner

*Primary Examiner* — Joseph Del Sole
*Assistant Examiner* — Dimple Bodawala
(74) *Attorney, Agent, or Firm* — Hovey Williams LLP

(57) ABSTRACT

A sealing device for forming an airtight seal between a first body, such as a cure tool, and a second body, such as a vacuum bag, without the use of adhesives. The sealing device may comprise an outer surface attached to the second body, an inner surface configured to face the first body, and two cusps located at opposite edges of the inner and outer surfaces. The sealing device may form a continuous boundary around an area of any shape or size. The sealing device may have a substantially crescent-shaped cross-section, allowing the sealing device to suction to the first body when compressed against the first body. The sealing device may also comprise a tab portion protruding from the inner surface between the first and second cusp for providing a more secure seal between the sealing device and the first body.

5 Claims, 2 Drawing Sheets

REUSABLE SEALING DEVICE

BACKGROUND

1. Field

The present invention relates to composite parts used in aircrafts and other applications. More particularly, the present invention relates to a reusable sealing device for use in vacuum assisted resin transfer molding.

2. Related Art

Vacuum assisted resin transfer molding (VARTM) is a composite manufacturing process for making composite parts. Using the VARTM process, dry fibers of a composite material may first be laid on a tool beneath a nylon vacuum bag, and the nylon vacuum bag may be sealed to the tool around the composite material using chromate vacuum bag tape. Then the air between the vacuum bag and the tool may be removed, compressing the vacuum bag against the composite material, while liquid resin is also simultaneously drawn through the composite material using a vacuum pump. Once the liquid resin is distributed throughout the composite material and the vacuum bag is compressed against the composite material by vacuum force, the vacuum pump may be removed, and the part may then be cured by heat to harden the composite part.

Chromate vacuum bag tape is an adhesive material that creates an airtight seal between the vacuum bag and the tool, but like most adhesive materials, can not be reused.

Therefore an improved sealing device for forming an airtight seal between a vacuum bag and a tool for vacuum assisted resin transfer molding is desired.

SUMMARY

The present invention provides an elongated sealing device for forming an airtight seal between a first body and a second body without the use of adhesives. The sealing device may be made of a substantially flexible, durable material such as rubber, silicone, or rubber-like materials. The sealing device may form a continuous boundary around an area of any size or shape.

The sealing device may comprise an outer surface, an inner surface, a first cusp, and a second cusp. The distance between the first cusp and the second cusp may define the width of the sealing device. The sealing device may be substantially crescent-shaped in cross-section.

The sealing device may further comprise a tab portion protruding from the inner surface of the sealing device approximately centered between the first cusp and the second cusp. In one embodiment of the sealing device, the tab portion may be configured to substantially match the shape of a groove in the first body and may be located therein when compressed against the first body. In another embodiment of the sealing device, the tab portion may comprise a secondary seal having a substantially crescent-shaped cross-section and a linking portion connecting the secondary seal with the inner surface of the sealing device. The secondary seal may be located inward of the first and second cusps.

These and other important aspects of the present invention are described more fully in the detailed description below.

BRIEF DESCRIPTION OF THE DRAWINGS

Embodiments of the present invention are described in detail below with reference to the attached drawing figures, wherein.

Figure 1:
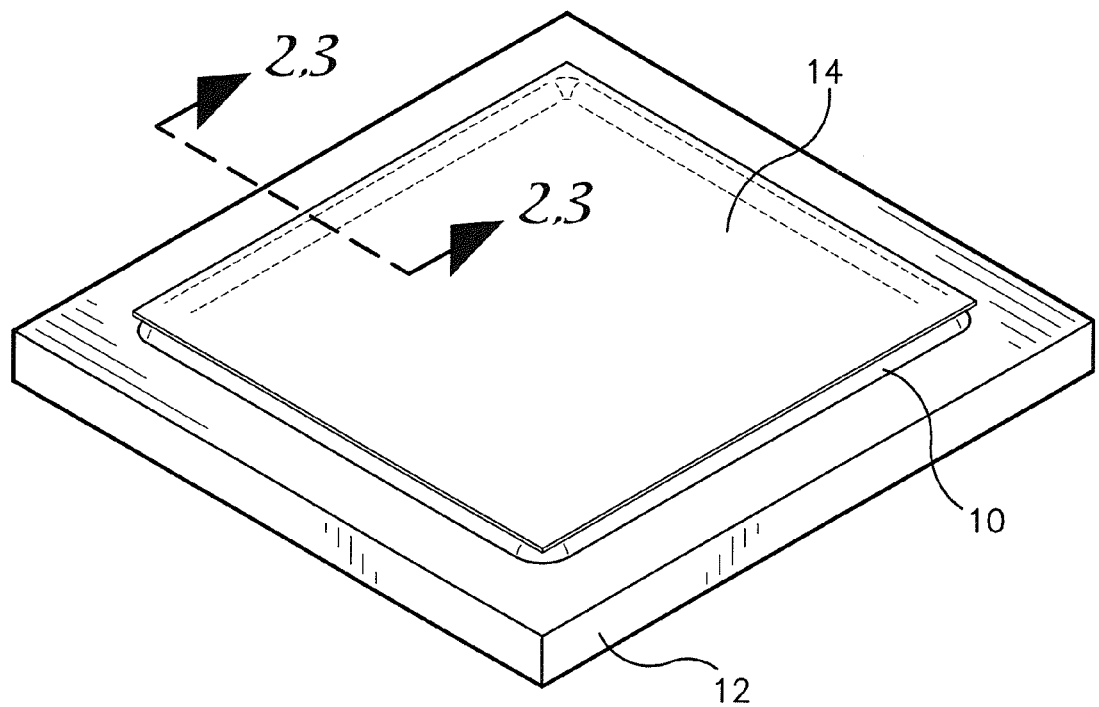
FIG. 1 is a perspective view of a sealing device constructed in accordance with an embodiment of the present invention.

The drawing figure does not limit the present invention to the specific embodiments disclosed and described herein. The drawing is not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

As illustrated in FIG. 1, embodiments of the present invention provide a sealing device 10 for forming an airtight seal between a first body 12 and a second body 14. The first body 12 may be any substantially rigid body such as a tool onto which composite material may be compressed and cured. The second body 14 may be any body which requires attachment and/or airtight sealing to another body. For example, the second body 14 may be a substantially flexible sheet of material, such as a composite vacuum bag for compressing composite material against the first body 12.

Figure 2:
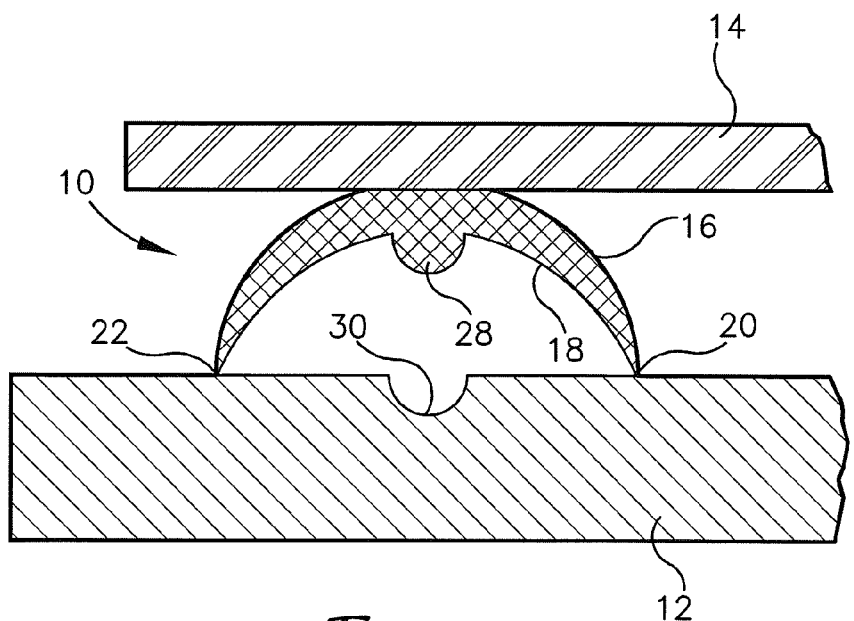
FIG. 2 is a partial vertical cross-sectional elevation view of one embodiment of the sealing device taken along line 2-2 of FIG. 1.

The sealing device 10 may be made out of a substantially durable and flexible material such as rubber, silicone, and/or a rubber-like material. As best illustrated in FIG. 2, one embodiment of the sealing device 10 may comprise an outer surface 16, an inner surface 18 positioned opposite the outer surface 16, a first cusp 20, and a second cusp 22 positioned opposite the first cusp 20. The inner surface 18 may be configured to face toward the first body 12, and the outer surface 16 may be configured to face away from the first body 12 and to be attached to or integral with the second body 14. The first cusp 20 and the second cusp 22 may be edges at which the outer surface 16 and the inner surface 18 of the sealing device 10 join together.

The sealing device 10 may be substantially elongated so that its length is greater than its width. The sealing device 10 may be substantially crescent-shaped in cross-section with both the outer surface 16 and the inner surface 18 having a curved C-shape. The outer and inner surfaces 16,18 converge to form the first and second cusps 20,22, which may physically contact the first body 12. The distance from the first cusp 20 to the second cusp 22 may define the width of the sealing device 10.

The sealing device 10 may be formed in any length and may follow a linear, curvilinear, and/or continuous path. If the sealing device 10 follows a continuous path, it may form a boundary around an area of any size or shape. For example, the sealing device 10 may be used to vacuum bag a composite material by forming an airtight seal between a vacuum bag and a tool around an entire peripheral edge of the composite material. More specifically, the sealing device 10 may replace traditional vacuum bag tape in a Vacuum Assisted Resin Transfer Molding (VARTM) process.

In various embodiments of the invention, as illustrated in FIG. 2, the inner surface 18 of the sealing device 10 may have an outwardly protruding tab portion 28 centered at or proximate a half-way point between the first and second cusps 20,22 and extending substantially the entire length of the sealing device 10. The illustrated tab portion 28 is semicircular in cross-section and is centered between the cusps 20,22. However, the tab portion 28 may be of any desired shape and size and may be positioned anywhere on the sealing device 10.

Figure 3:
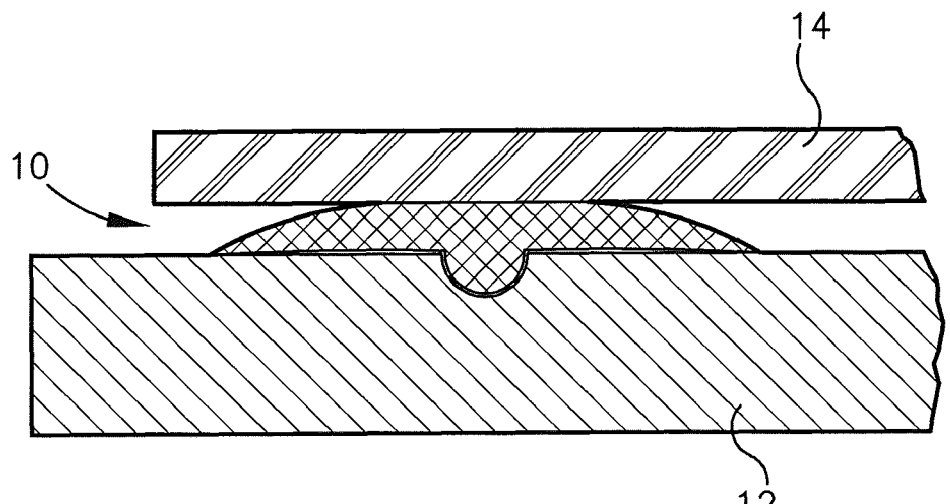
FIG. 3 is a partial vertical cross-sectional elevation view of the sealing device of FIG. 2 when compressed against a first body by a second body.

As illustrated in FIG. 2, the first body 12 may comprise an elongated groove 30 having one or more inner walls and configured for receiving the tab portion 28 of the sealing device 10. The groove 30 may form an opening of substantially the same configuration, size, and dimensions as the tab portion 28 of the sealing device 10. When the sealing device 10 is compressed against the first body 12, the tab portion 28 may be received within the groove 30 and may physically contact the inner walls of the groove 30, as illustrated in FIG. 3.

The tab portion 28 provides a greater amount of surface area to seal against the first body 12. Additionally, the tab portion 28 provides positive location of the second body 14 to be sealed to the first body 12, reducing any risk of the sealing device 10 rotating, which can be a source of vacuum leaks or air leaks in prior art seal designs.

Figure 4:
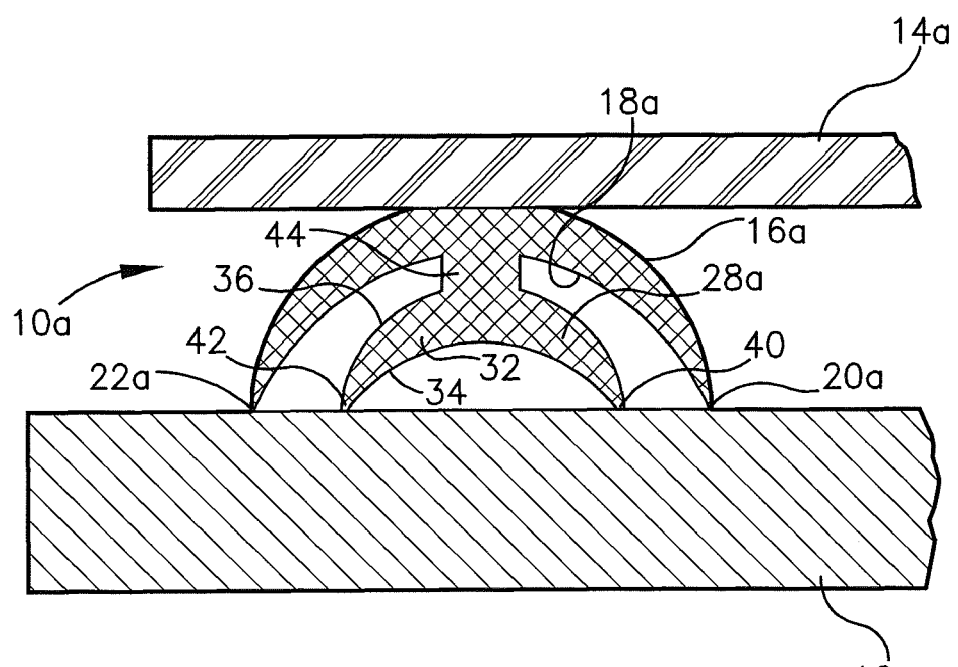
FIG. 4 is a partial vertical cross-sectional elevation view of another embodiment of the sealing device taken along line 3-3 of FIG. 1.

A sealing device 10a constructed in accordance with another embodiment of the invention is illustrated in FIG. 4. The sealing device 10a may seal a first body 12a to a second body 14a, and may comprise an outer surface 16a, an inner surface 18a, a first cusp 20a, and a second cusp 22a. These portions of the sealing device 10a are substantially similar to the like-numbered portions of the sealing device 10 described above. The sealing device 10a may also comprise the tab portion 28a protruding from the inner surface 18a between the first cusp 20a and the second cusp 22a. The tab portion 28a may comprise a secondary seal 32 inward of the first and second cusps 20a,22a and having an inner portion 34 and an outer portion 36. The secondary seal 32 may be substantially crescent-shaped in cross-section, with both the outer portion 36 and the inner portion 34 having a curved C-shape. The inner and outer portions 34,36 converge to form a third cusp 40 and a fourth cusp 42, which may physically contact the first body 12a. The third cusp 40 may be positioned proximate the first cusp 20a and the fourth cusp 42 may be positioned proximate the second cusp 22a.

The tab portion 28a may also comprise a linking portion 44, having a width narrower than a width of the secondary seal 32. The linking portion 44 may extend from the inner surface 18a of the sealing device 10a to attach to the outer portion 36 of the secondary seal 32. The linking portion 44 may provide distance between the outer portion 36 of the secondary seal 32 and the inner surface 18a of the sealing device 10a, as well as between the first cusp 20a and the third cusp 40 and between the second cusp 22a and the fourth cusp 42. Alternatively, the linking portion 44 may be omitted, and the outer portion 36 of the secondary seal 32 may directly attach to or be integral with the inner surface 18a of the sealing device 10. The first cusp 20a, second cusp 22a, third cusp 40, and the fourth cusp 42 may simultaneously physically contact the first body 12a.

A method of using the sealing device 10 may comprise compressing the inner surface 18,18a of the sealing device 10,10a against the first body 12,12a. Positive pressure on the outer surface 16,16a of the sealing device 10,10a and/or vacuum suction exerted on the second body 14,14a may force the sealing device 10, 10a downward toward the first body 12,12a. In the embodiment illustrated in FIG. 2, the method may also comprise aligning the tab portion 28 with the elongated groove 30 of the first body 12.

Once the positive pressure and/or vacuum suction pressing the sealing device 10,10a against the first body 12,12a is removed, the sealing device 10,10a may retain an airtight seal against the first body 12,12a. In this way, the sealing device 10,10a may act in a manner similar to a suction cup. Upon pressing the sealing device 10,10a against the first body 12,12a, air pressure between the sealing device 10,10a and the first body 12,12a is greatly reduced. The relatively higher atmospheric pressure outside of the sealing device 10,10a, combined with the friction between the sealing device 10,10a and the first body 12,12a, prevents the sealing device 10,10a from lifting away from the first body 12,12a. To remove the sealing device 10,10a from the first body 12,12a, it may be physically pried off, pulled off, or peeled off of the first body 12,12a. Because the sealing device 10,10a is not chemically bonded or otherwise bonded to the first body 12,12a and may be removed from the first body 12,12a without damaging either the sealing device 10,10a or the first body 12,12a, the sealing device 10,10a is reusable.

Although the invention has been described with reference to the embodiments illustrated in the attached drawings, it is noted that equivalents may be employed and substitutions made herein without departing from the scope of the invention as recited in the claims.

Having thus described an embodiment of the invention, what is claimed as new and desired to be protected by Letters Patent includes the following:

1. An elongated sealing device for forming an airtight seal between a first body and a second body, the sealing device comprising:
   a primary seal portion having a substantially crescent-shaped cross-section, wherein the primary seal portion comprises:
      an outer surface configured to face away from the first body;
      an inner surface opposite the outer surface and configured to face toward the first body;
      a first cusp at which the outer surface joins with the inner surface; and
      a second cusp at which the outer surface joins with the inner surface, wherein the distance from the first cusp to the second cusp defines a width of the sealing device; and
   a tab portion protruding outward from and integral with the inner surface of the primary seal portion and configured to mate with the first body, wherein the tab portion comprises:
      an elongated secondary seal attached to the inner surface of the primary seal portion and having an inner portion, an outer portion, a third cusp, and a fourth cusp located inward of the first cusp and the second cusp, the secondary seal being substantially crescent-shaped in cross-section and curved in the same direction as the primary seal portion,
   wherein the sealing device is flexible and is configured such that when a force compresses the sealing device onto the first body, air is forced out from between the sealing device and the first body and air pressure and friction forces maintain an airtight seal between the sealing device and the first body.

2. The sealing device of claim 1, wherein the sealing device has a substantially continuous length configured to form a continuous boundary around an area.

3. The sealing device of claim 1, wherein at least part of the tab portion is shaped to substantially match a groove formed in the first body.

4. The sealing device of claim 1, wherein the tab portion further comprises:

a linking portion attaching the inner surface of the primary seal portion to the outer portion of the secondary seal such that the first cusp is separated from the third cusp by a distance and the second cusp is separated from the fourth cusp by a distance.

5. The sealing device of claim 1, wherein the second body is a flexible sheet of material integrally formed to the outer surface of the primary seal portion.

\* \* \* \* \*